US010479351B2

(12) United States Patent
Cho

(10) Patent No.: US 10,479,351 B2
(45) Date of Patent: Nov. 19, 2019

(54) DOWNSHIFT CONTROL METHOD FOR HYBRID DCT VEHICLE

(71) Applicants: HYUNDAI MOTOR COMPANY, Seoul (KR); KIA MOTORS CORPORATION, Seoul (KR)

(72) Inventor: Sung Hyun Cho, Yongin-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 36 days.

(21) Appl. No.: 15/985,008

(22) Filed: May 21, 2018

(65) Prior Publication Data

US 2019/0176807 A1  Jun. 13, 2019

(30) Foreign Application Priority Data

Dec. 13, 2017 (KR) .................... 10-2017-0171061

(51) Int. Cl.
*B60K 6/387* (2007.10)
*B60K 6/547* (2007.10)
(Continued)

(52) U.S. Cl.
CPC ............. *B60W 20/30* (2013.01); *B60K 6/387* (2013.01); *B60K 6/547* (2013.01); *B60W 30/188* (2013.01); *B60W 30/19* (2013.01); *B60W 2510/081* (2013.01); *B60W 2510/1015* (2013.01); *B60W 2550/142* (2013.01); *B60W 2710/021* (2013.01);
(Continued)

(58) Field of Classification Search
CPC ................... B60K 6/387; B60K 6/547; B60K 2006/4825; B60W 2550/142; B60W 2710/021; B60W 2710/027; B60W 2710/083; B60W 30/19
See application file for complete search history.

(56) References Cited

U.S. PATENT DOCUMENTS 9,937,925 B2* 4/2018 Cho .......................... B60K 6/48
2015/0072831 A1* 3/2015 Sakata ..................... B60K 6/48
477/5

(Continued)

FOREIGN PATENT DOCUMENTS

JP         4001013 B2    10/2007
JP      2015-209156 A    11/2015
(Continued)

*Primary Examiner* — Tisha D Lewis
(74) *Attorney, Agent, or Firm* — Brinks Gilson & Lione

(57) ABSTRACT

Disclosed is a downshift control method for a hybrid DCT vehicle. The method includes: determining, by a controller, whether a downshift is desired while a vehicle travels on a slope having equal to or more than a predetermined reference gradient; comparing, by the controller, a motor speed with a desired shift stage input shaft speed, and selectively performing either a forward control step of increasing a motor torque in a forward direction to increase the motor speed in the forward direction or a negative control step of increasing the motor torque in a negative direction to increase the motor speed in the negative direction. Thus, it is possible to reduce the backward sliding of the vehicle by suppressing the motor speed from unnecessarily increasing and rapidly finishing the downshift.

5 Claims, 3 Drawing Sheets

(51) Int. Cl.
*B60W 30/19* (2012.01)
*B60W 20/30* (2016.01)
*B60W 30/188* (2012.01)

(52) U.S. Cl.
CPC . *B60W 2710/027* (2013.01); *B60W 2710/083* (2013.01); *B60W 2710/1005* (2013.01); *B60Y 2200/92* (2013.01); *B60Y 2300/181* (2013.01); *B60Y 2300/188* (2013.01); *B60Y 2300/19* (2013.01); *Y10S 903/914* (2013.01); *Y10S 903/919* (2013.01); *Y10S 903/93* (2013.01)

(56) References Cited

U.S. PATENT DOCUMENTS

| | | | |
|---|---|---|---|
| 2017/0129494 A1* | 5/2017 | Cho | B60K 6/48 |
| 2017/0369068 A1* | 12/2017 | Cho | B60W 10/02 |
| 2018/0015915 A1* | 1/2018 | Cho | B60W 20/15 |
| 2018/0162362 A1* | 6/2018 | Cho | B60W 20/15 |

FOREIGN PATENT DOCUMENTS

| | | |
|---|---|---|
| KR | 10-1694074 B1 | 1/2017 |
| KR | 10-1714192 B1 | 3/2017 |

\* cited by examiner

DOWNSHIFT CONTROL METHOD FOR HYBRID DCT VEHICLE

CROSS REFERENCE TO RELATED APPLICATION

This application claims priority to and the benefit of Korean Patent Application No. 10-2017-0171061, filed on Dec. 13, 2017, which is incorporated herein by reference in its entirety.

FIELD

The present disclosure relates to a downshift control method for a dual clutch transmission (DCT) for a hybrid vehicle.

BACKGROUND

The statements in this section merely provide background information related to the present disclosure and may not constitute prior art.

A transmission-mounted electric device (TMED) type hybrid vehicle having a DCT is configured such that, in a state in which an engine, a motor, and a DCT are arranged in sequence, an engine clutch is provided between the engine and the motor, and the motor is mounted to the transmission with respect to the engine clutch. When the TMED-type hybrid DCT vehicle is downshifted to a lower shift stage as it slows down on the uphill road, the vehicle in a forward running state in which the vehicle's speed is above zero "0" becomes to slide backward (namely, a negative speed). We have discovered that, when the DCT is downshifted while the vehicle slows down on the uphill road, gear-shifting may be delayed due to an excessive increase in motor speed, thereby causing the vehicle to increasingly slide backward (i.e., increase in the negative speed).

This is because, if the vehicle already begins to slide backward when a controller for controlling the DCT determines that the vehicle still travels forward and thus performs control for increasing a motor torque to rapidly synchronize the motor speed with a desired shift stage input shaft speed, the desired shift stage input shaft speed suddenly becomes a negative speed lower than a current shift stage input shaft speed as well as the motor speed, in which case the motor speed is unnecessarily increased since two clutches of the DCT are released, and gear shifting is delayed since it takes much time until the motor speed is synchronized with the desired shift stage input shaft speed, thereby causing the vehicle to continuously slide backward while the gear shifting is delayed.

The foregoing is intended merely to aid in the understanding of the background of the present disclosure, and is not intended to mean that the present disclosure falls within the purview of the related art that is already known to those skilled in the art.

SUMMARY

The present disclosure propose a downshift control method for a dual clutch transmission (DCT) for a hybrid vehicle, capable of reducing backward sliding of a TMED-type hybrid DCT vehicle when the vehicle begins to slide backward due to a reduction in its speed while traveling up on a slope by suppressing a motor speed from unnecessarily increasing in the case where a downshift is performed and by more rapidly finishing the downshift.

In accordance with one aspect of the present disclosure, a downshift control method for a hybrid DCT vehicle includes the steps of: determining, by a controller, whether a downshift is desired while a vehicle travels up on a slope having equal to or more than a predetermined reference gradient; releasing, by the controller, a release-side clutch by reducing its torque when the controller determines that the downshift is desired because the vehicle travels up on the slope having equal to or more than the reference gradient; comparing, by the controller, a motor speed with a desired shift stage input shaft speed when the release of the release-side clutch is completed in the step of releasing the release-side clutch by reducing its torque; increasing, by the controller, a motor torque in a forward direction to increase the motor speed in the forward direction when the motor speed is lower than or equal to the desired shift stage input shaft speed in the comparing step; increasing, by the controller, the motor torque in a negative direction to increase the motor speed in the negative direction when the motor speed exceeds the desired shift stage input shaft speed in the comparing step; checking, by the controller, whether the motor speed is synchronized with the desired shift stage input shaft speed in the step of increasing the motor torque in the forward direction or in the step of increasing the motor torque in the negative direction to increase the motor speed in the negative direction in a state in which gear engagement in a desired shift stage is completed; and completing, by the controller, gear shifting by controlling the torque of the engagement-side clutch and the torque of the release-side clutch when the motor speed is synchronized with the desired shift stage input shaft speed.

The downshift control method may further include: determining, by the controller, whether the vehicle already begins to slide backward when the gear shifting to the desired shift stage is completed by comparing the desired shift stage input shaft speed with a predetermined reference speed while the step of releasing the release-side clutch by reducing its torque is performed. When the vehicle is determined to already begin to slide backward in the completion of the gear shifting in the step of determining whether the vehicle already begins to slide backward, the step of comparing the motor speed with the desired shift stage input shaft speed may not be performed and the step of increasing the motor torque in the negative direction to increase the motor speed in the negative direction may be performed.

In the step of increasing the motor torque in the negative direction, the reduced torque of the release-side clutch may be gradually increased until the gear engagement in the desired shift stage is performed.

In the step of increasing the motor torque in the forward direction, the torque of the released release-side clutch may be gradually increased until the gear engagement in the desired shift stage is performed.

When a difference between the motor speed and the desired shift stage input shaft speed is less than a predetermined amount of reference slip in the step of checking whether the motor speed is synchronized with the desired shift stage input shaft speed, the controller may determine that the synchronization is completed, and the controller may release the release-side clutch by reducing the torque thereof and simultaneously engage the engagement-side clutch by increasing the torque thereof, and may cause the motor torque to be gradually converged to a desired motor torque so that the gear shifting is completed.

As apparent from the above description, the present disclosure can reduce the backward sliding of a TMED-type hybrid DCT vehicle when the vehicle begins to slide backward due to a reduction in its speed while traveling up on a slope by suppressing a motor speed from unnecessarily increasing in the case where a downshift is performed and by more rapidly finishing the downshift.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
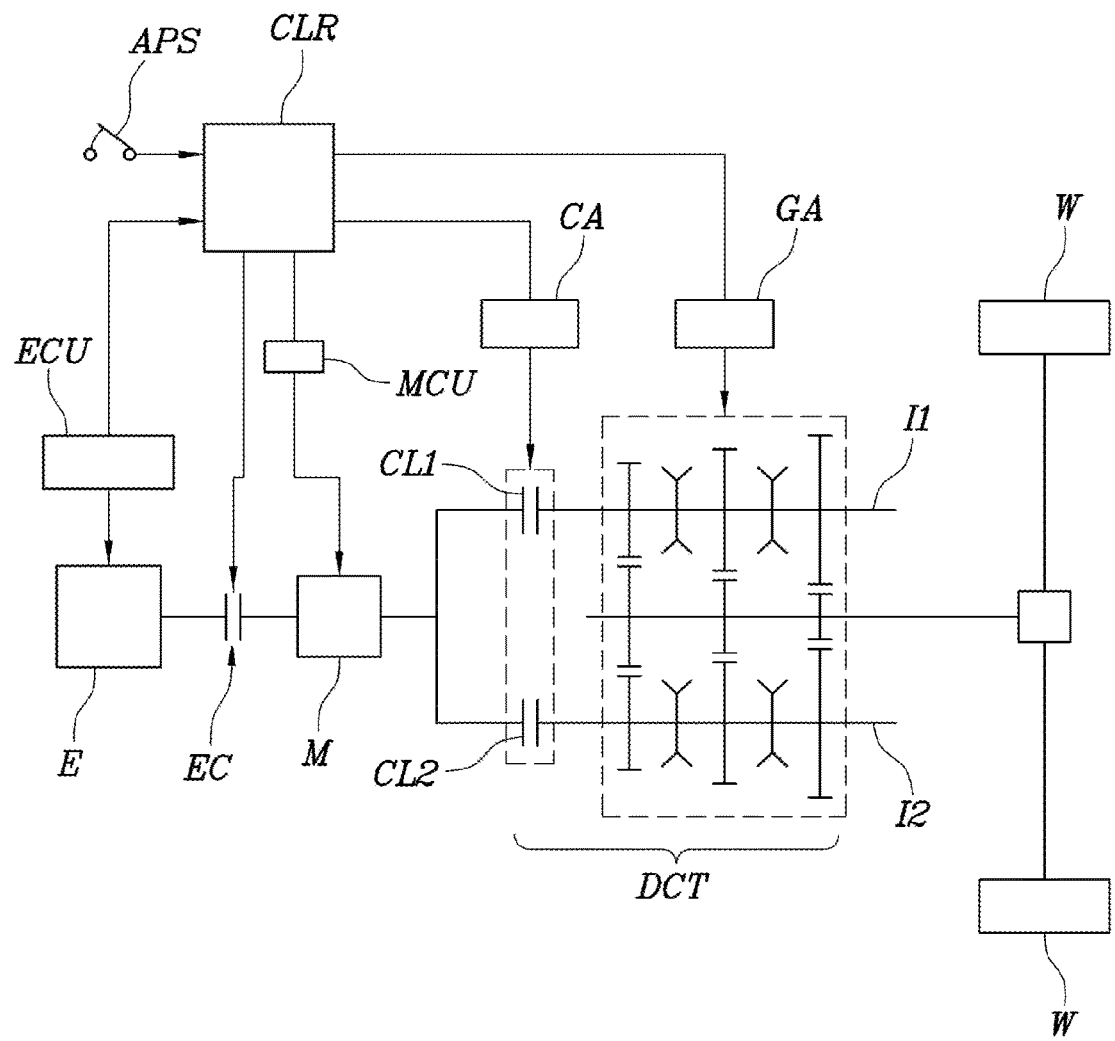
FIG. 1 is a diagram illustrating a configuration of a TMED-type hybrid DCT vehicle to which the present disclosure is applicable.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

FIG. 1 illustrates a configuration of a TMED-type hybrid DCT vehicle to which the present disclosure is applicable. In the vehicle, an engine clutch EC is provided between an engine E and a motor M so that the power of the engine E passes through the engine clutch EC and the motor M, and then selectively provided to two input shafts I1 and I2 through two clutches CL1 and CL2 of a DCT, and speed and torque of the power are changed in the DCT and then provided to drive wheels W.

A controller CLR is connected to an engine control unit (ECU) to receive information such as an engine torque and request a torque reduction to the engine E. The controller CLR is configured to control a clutch actuator CA for controlling two clutches of the DCT and a gear actuator GA for changing the gear engagement in the DCT and to control the engine clutch EC. The controller CLR may be implemented by at least one processor operated by a setting program, in which the setting program includes a series of commands for performing each step included in the control method according to the present disclosure to be described below.

The motor M includes a separate motor control unit (MCU) for control. The controller may modify a motor torque to a desired state by requesting adjustment of the motor torque to the MCU.

The controller CLR is configured to receive a signal from an accelerator pedal sensor (APS) and to receive a rotational speed of each input shaft I1 or I2 of the DCT.

The two clutches may be divided into a clutch used to implement a current shift stage and a clutch used to implement a new desired shift stage during gear shifting. Hereinafter, the clutch, which is released according to the progression of gear shifting while implementing the current shift stage, is referred to as a "release-side clutch", whereas the clutch, which is gradually engaged to implement the desired shift stage, is referred to as an "engagement-side clutch".

In addition, according to the division of the clutch, the input shaft, which is connected to the release-side clutch, is referred to as a "release-side input shaft", whereas the input shaft, which is connected to the engagement-side clutch, is referred to as an "engagement-side input shaft".

In addition, in the following description, the term "desired shift stage input shaft speed" means a rotational speed of an input shaft used to implement a desired shift stage when the gears in the desired shift stage are engaged, whereas the term "current shift stage input shaft speed" means a rotational speed of an input shaft used to implement a current maintained shift stage before it is shifted to the desired shift stage.

Figure 2:
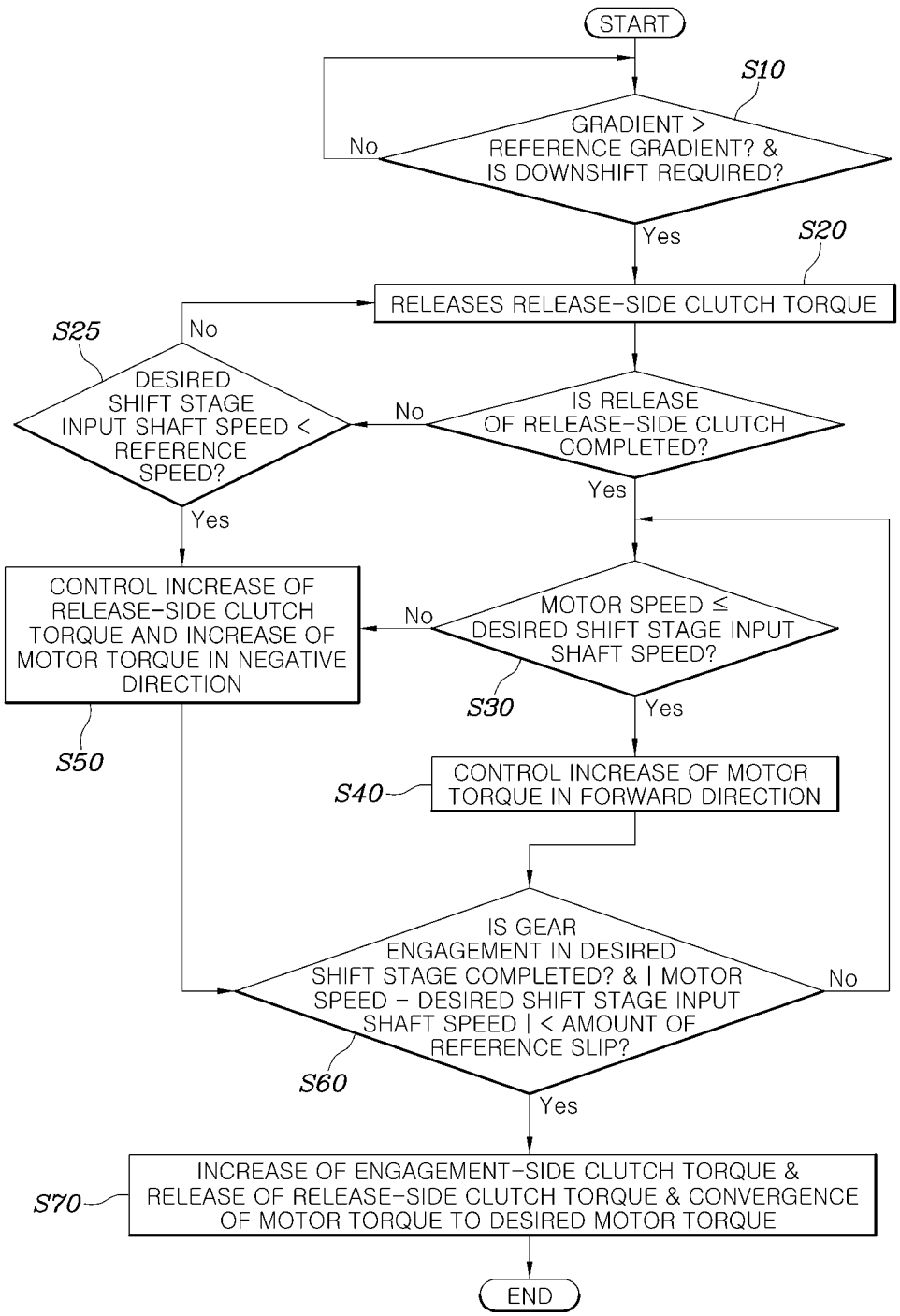
FIG. 2 is a flowchart illustrating a downshift control method for a hybrid DCT vehicle in one form of the present disclosure.
Figure 3:
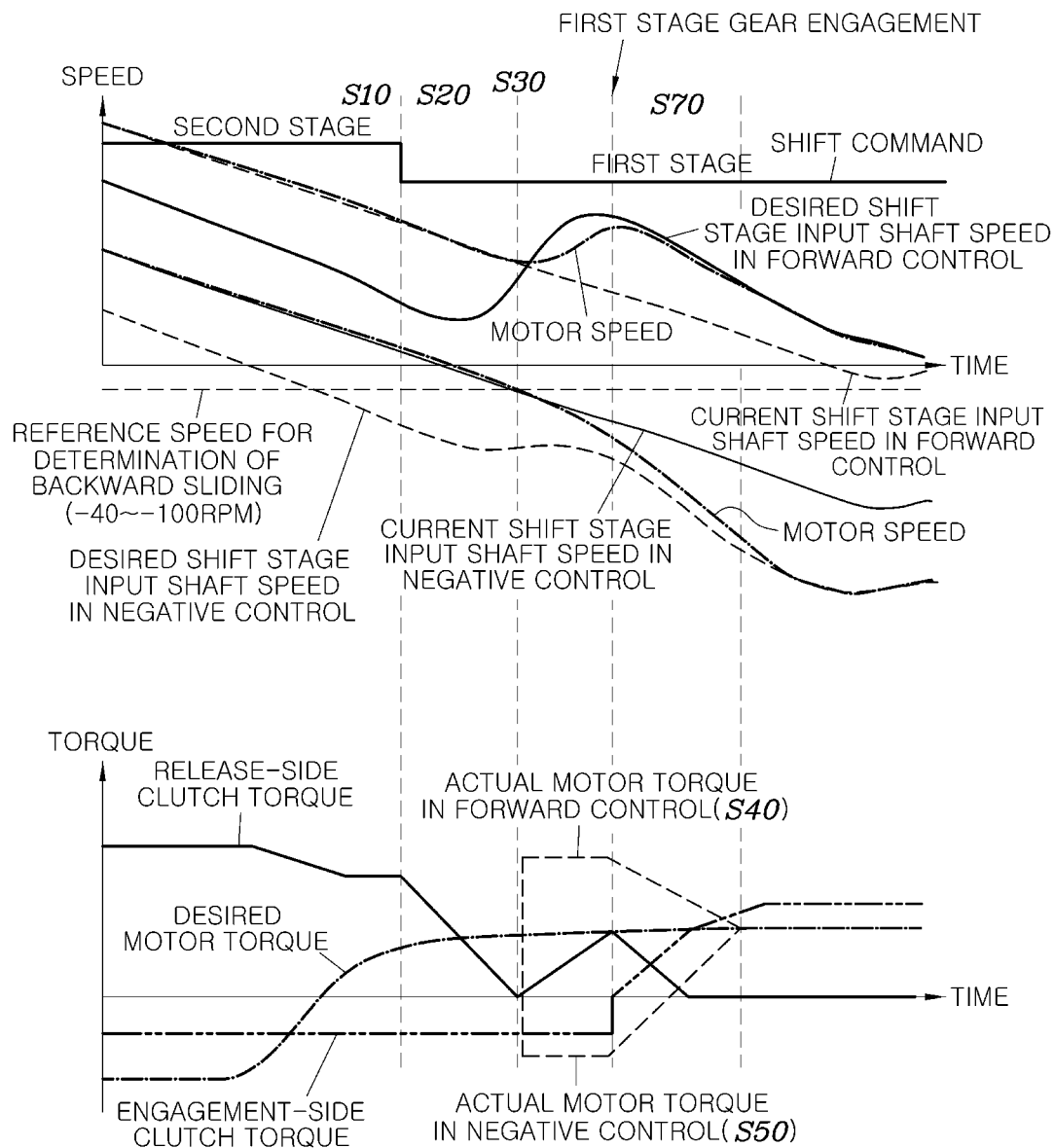
FIG. 3 is a graph for explaining the downshift control method for a hybrid DCT vehicle in one form of the present disclosure.

Referring to FIGS. 2 and 3, a downshift control method for a hybrid DCT vehicle in one form of the present disclosure includes a situation determination step S10 of determining whether a downshift is desired by a controller CLR while a vehicle travels up on a slope having equal to or more than a predetermined reference gradient, a release-side control step S20 of releasing a release-side clutch by reducing the torque thereof when the controller determines that the downshift is desired while the vehicle travels up on the slope having equal to or more than the reference gradient, a speed comparison step S30 of comparing a motor speed with a desired shift stage input shaft speed by the controller when the release of the release-side clutch is completed in the release-side control step S20, a forward control step S40 of increasing a motor torque in a forward direction to increase the motor speed in the forward direction by the controller when the motor speed is determined to be lower than or equal to the desired shift stage input shaft speed in the speed comparison step S30, a negative control step S50 of increasing the motor torque in a negative direction to increase the motor speed in the negative direction by the controller when the motor speed is determined to exceed the desired shift stage input shaft speed in the speed comparison step S30, a synchronization check step S60 of checking whether the motor speed is synchronized with the desired shift stage input shaft speed by the controller in the forward control step S40 or the negative control step S50 in a state in which the gear engagement in a desired shift stage is completed, and a shift completion step S70 of completing gear shifting by controlling the torque of an engagement-side clutch and the torque of the release-side clutch by the controller when the synchronization of the motor speed is checked in the synchronization check step S60.

In addition, the method further includes a backward sliding prediction step S25 of determining whether the vehicle already begins to slide backward when the gear shifting to the desired shift stage is completed by comparing the desired shift stage input shaft speed with a predetermined reference speed by the controller while the release-side control step S20 is performed.

Here, the reference speed may be set as about −40 RPM to −100 RPM.

When the vehicle is determined to already begin to slide backward in the completion of the gear shifting in the backward sliding prediction step S25, the method does not perform the speed comparison step S30 but performs the negative control step S50.

That is, when the downshift is desired due to the reduction in speed when the vehicle travels up on the slope having equal to or more than the reference gradient, the controller releases the release-side clutch. When it is determined that the vehicle slides backward when the downshift to the desired shift stage is completed in the backward sliding prediction step S25 or when it is determined that the motor speed exceeds the desired shift stage input shaft speed in the speed comparison step S30, the controller performs the negative control step S50 so that the gear shifting is completed by rapidly synchronizing the motor speed with the desired shift stage input shaft which is reversely driven. When it is determined that the motor speed is lower than or equal to the desired shift stage input shaft speed in the state in which the release-side clutch is fully released in the speed comparison step S30 and it is checked that the vehicle does not yet slide backward, the controller increases the motor torque in the forward direction to increase the motor speed in the forward direction, as in a conventional typical downshift, with the consequence that the motor speed is synchronized with the desired shift stage input shaft speed and the gear shifting is completed.

In the present form, when the vehicle begins to slide backward before the downshift is completed after beginning, the controller actively determines it and actively controls the direction of the motor torque so that the motor speed is rapidly synchronized with the desired shift stage input shaft speed even when the desired shift stage input shaft speed is negative. Thus, it is possible to reduce the backward sliding of the vehicle by inhibiting or preventing the motor speed from unnecessarily increasing and the rapid completion of the downshift.

Of course, when the downshift is completed in the case where the vehicle already slides backward as described above, the controller changes the motor torque in the forward direction while the gear shifting is completed, thereby inhibiting or preventing the vehicle from further sliding backward.

Accordingly, the reference gradient in the situation determination step S10 may be set as a gradient at which the vehicle slides backward before the downshift is completed after beginning when the vehicle is downshifted due to the reduction in its speed while traveling on the uphill road as described above. For example, the reference gradient may be set as a gradient of 15%.

The controller controls the reduced release-side clutch torque to gradually increase until the gear engagement in the desired shift stage is performed in the negative control step S50.

In addition, the controller gradually increases the torque of the released release-side clutch until the gear engagement in the desired shift stage is performed in the forward control step S40.

As described above, the control of the release-side clutch to gradually increase until the gear engagement in the desired shift stage is performed in the forward control step S40 and the negative control step S50 is commonly illustrated in FIG. 3. This is a situation where the engagement-side clutch is released when the release-side clutch is fully released before the gear engagement in the desired shift stage, in which case the vehicle may excessively slide backward with no constraint. Therefore, the above control is to prevent this situation.

For reference, FIG. 3 illustrates a downshift process from a current second shift stage to a desired first shift stage, wherein an example in which the forward control step S40 is performed is illustrated above in FIG. 3 and an example in which the negative control step S50 is performed is illustrated below in FIG. 3.

In the example of the forward control step S40 above, the desired shift stage input shaft speed is initially lower than the current shift stage input shaft speed by the drag in the DCT and is then higher than the current shift stage input shaft speed, as illustrated in the drawing, when first gear engagement in the desired shift stage is performed. In this case, the motor speed has to be synchronized with the increased desired shift stage input shaft speed for completion of gear shifting as described above. To this end, the forward control step S40 is performed to increase the motor torque in the forward direction to increase the motor speed.

When it is determined that the downshift from a second range to a first range is desired in the situation determination step S10, the controller immediately begins the first gear engagement. However, the time at which the first gear engagement is completed is substantially apt to be after the release-side clutch torque is fully released as illustrated in the drawing.

Accordingly, before the gear engagement in the desired shift stage is completed, the control to gradually increase the torque of the released release-side clutch is performed to inhibit or prevent the vehicle from sliding backward with out of control.

Meanwhile, the desired motor torque illustrated below in FIG. 3 means a desired motor torque to be controlled by the MCU if it is not requested by the controller for controlling the DCT. That is, if there are no control portions for increasing the motor torque in the forward direction in the forward control step S40 and increasing the motor torque in the negative direction in the negative control step S50, the motor torque is output as a desired intermediate motor torque.

That is, the actual motor torque illustrated above in FIG. 3 means an actual torque generated in the motor by a request of the controller to the MCU for performing the forward control step S40. The actual motor torque illustrated below the desired motor torque means an actual torque generated in the motor by a request of the controller to the MCU while the negative control step S50 is performed.

When the difference between the motor speed and the desired shift stage input shaft speed is less than a predetermined amount of reference slip in the synchronization check step S60, the controller determines that the synchronization is completed.

Since the amount of reference slip is used to check the completion of the synchronization, it may be set suitable for the purpose. For example, the amount of reference slip may be set as about 30 to 50 RPM.

In the shift completion step S70, the controller releases the release-side clutch by reducing the torque thereof and simultaneously engages the engagement-side clutch by increasing the torque thereof, so that the gear shifting is completed.

In addition, in the shift completion step S70, the controller causes the motor torque to be gradually converged to a desired motor torque and forms the engagement-side clutch torque to be higher than the desired motor torque at a certain level after the gear shifting is completed. Thus, it is possible to inhibit or prevent the sliding of the engagement-side clutch and securely obtain power transmission.

Although the exemplary forms of the present disclosure have been disclosed for illustrative purposes, those skilled in the art will appreciate that various modifications, additions and substitutions are possible, without departing from the scope and spirit of the present disclosure.

What is claimed is:

1. A downshift control method for a dual clutch transmission for a hybrid vehicle, the method comprising the steps of:
   determining, by a controller, whether a vehicle travels on a slope having equal to or more than a predetermined reference gradient for a downshift;
   releasing, by the controller, a release-side clutch by reducing a torque thereof when the controller determines that the vehicle travels on the slope having equal to or more than the reference gradient;
   comparing, by the controller, a motor speed with a desired shift stage input shaft speed when the release of the release-side clutch is completed in the step of releasing the release-side clutch by reducing the torque;
   increasing, by the controller, a motor torque in a forward direction when the motor speed is lower than or equal to the desired shift stage input shaft speed in the comparing step;
   increasing, by the controller, the motor torque in a negative direction when the motor speed is determined to exceed the desired shift stage input shaft speed in the comparing step;
   checking, by the controller, whether the motor speed is synchronized with the desired shift stage input shaft speed in the step of increasing the motor torque in the forward direction or in the step of increasing the motor torque in the negative direction when gear engagement in the desired shift stage is completed; and
   completing, by the controller, gear shifting by controlling a torque of an engagement-side clutch and the torque of the release-side clutch when the motor speed is synchronized with the desired shift stage input shaft speed.

2. The downshift control method according to claim 1, further comprising:
   determining, by the controller, whether the vehicle already begins to slide backward when the gear shifting to the desired shift stage is completed by comparing the desired shift stage input shaft speed with a predetermined reference speed while the step of releasing the release-side clutch is performed,
   wherein, when the vehicle is determined to already begin to slide backward in the completion of the gear shifting, the comparing step is not performed, and the step of increasing the motor torque in the negative direction to increase the motor speed in the negative direction is performed.

3. The downshift control method according to claim 2, wherein, in the step of increasing the motor torque in the negative direction, the reduced torque of the release-side clutch is gradually increased until the gear engagement in the desired shift stage is performed.

4. The downshift control method according to claim 1, wherein, in the step of increasing the motor torque in the forward direction to increase the motor speed in the forward direction, the torque of the released release-side clutch is gradually increased until the gear engagement in the desired shift stage is performed.

5. The downshift control method according to claim 1, wherein:
   when a difference between the motor speed and the desired shift stage input shaft speed is less than a predetermined amount of reference slip in the checking step, the controller determines that the synchronization is completed; and
   the controller releases the release-side clutch by reducing the torque thereof and simultaneously engages the engagement-side clutch by increasing the torque thereof, and causes the motor torque to be gradually converged to a desired motor torque so that the gear shifting is completed.

* * * * *